form emulsion,
United States Patent Office 3,258,398
Patented June 28, 1966

3,258,398
ACIDIC AQUEOUS ALKALI METAL ALGINATE AND LANOLIN ACNE VULGARIS PREPARATION
Herbert O. Doell, Cleveland, Ohio, assignor to Vienna Beauty Products Co., a corporation of Ohio
No Drawing. Filed Feb. 24, 1965, Ser. No. 435,089
3 Claims. (Cl. 167—58)

This application is a continuation-in-part of my co-pending application Serial No. 238,034, filed November 15, 1962, now abandoned.

This invention relates to a composition for the treatment of acne vulgaris.

In carrying out the invention in accordance with a preferred form thereof, a preparation is applied to the skin consisting essentially of an aqueous emulsion of lanolin, a stabilizer, a water soluble alkali metal or ammonium alginate, such as, sodium alginate, potassium alginate, or ammonium alginate; and sufficient organic carboxylic acid having hydroxyl substituent groups to give a pH between 4 and 6.

The invention is not limited to precise proportions of the various ingredients, but successful results have been accomplished by the use of a novel composition and method for its preparation described in the following illustrative examples:

A treating composition was made up of the following constituents:

3.5 parts by weight sodium alginate,
1.0 part by weight anhydrous lanolin,
0.2 part by weight of critric acid, or tartaric acid,
0.2 part by weight of sodium benzoate as a stabilizer,
95.0 parts by weight of water to form emulsion,
0.1 part by weight of perfume and/or colorant, if desired.

The citric acid and sodium benzoate were first added to water at about 200° F. At the same temperature the sodium alginate is dissolved with vigorous agitation, followed by addition of the lanolin. A stable emulsion was quickly produced which, upon standing at room temperature, hardened into a creamy mixture. If it is desired to incorporate perfume or coloring matter in the composition, this may be done by addition of these ingredients during the agitation and before the mixture has hardened. Although a specific quantity of citric acid has been specified, it will be understood that the major criteria in the selection of the amount of acid is the acidity produced which should be between 4 and 6 pH and consequently it may be necessary to adjust the amount of acid in order to keep the pH within the desired range, particularly if the proportions of other ingredients are varied from the suggested example.

In the preferred method of using the preparation for the treatment of acne, an amount of the preparation is applied to the face with the hands in a quantity sufficient to substantially cover the entire surface. Application before retiring at night is recommended in order to obtain maximum pH control. Any remaining film in the morning should be removed with either hot or cold water. Treatment functions also as a cleanser and occludes dirt, grease and the like without the use of harsh soaps or detergents.

Acne vulgaris responds to topical treatment with the compositions of this invention.

In accordance with the provisions of the patent statutes the invention has been described together with the composition now believed to represent the best embodiment thereof, but it is to be understood that the proportions may be varied and the method of preparation may be varied in a manner apparent to those skilled in the art without departing from the invention.

What is claimed is:
1. A composition of matter comprising an aqueous emulsion of a water soluble alkali metal alginate approximately 3.5 parts, lanolin approximately 1 part, sodium benzoate approximately .2 part, approximately 95 parts water, and approximately .2 part acid selected from the group consisting of citric acid and tartaric acid but adjusted to give a pH between 4 and 6.
2. A composition of matter consisting essentially of an emulsion of water approximately 95 parts, sodium alginate approximately 3.5 parts, lanolin approximately 1 part, citric acid approximately .2 part, sodium benzoate approximately .2 part, perfume and colorant not exceeding .1 part, and the acidity being adjusted to give a pH between 4 and 6.
3. A composition of matter consisting of an emulsion of water approximately 95 parts, sodium alginate approximately 3.5 parts, lanolin approximately 1 part, tartaric acid approximately .2 part, and perfume and colorant not exceeding .1 part.

References Cited by the Examiner
UNITED STATES PATENTS

| | | | |
|---|---|---|---|
| 2,118,566 | 5/1938 | Miles | 167—90 |
| 2,309,722 | 2/1943 | Wilkes et al. | 167—91 |
| 2,918,405 | 12/1959 | Barr et al. | 167—63 |
| 3,061,512 | 10/1962 | Anderson et al. | 167—58 |
| 3,137,622 | 6/1964 | Mueller | 167—58 |

OTHER REFERENCES

American Perfumer and Essential Oil Review, volume 63, No. 6, June 1954, p. 481.

De Kay: The Bulletin of the American Society of Hospital Pharmacy, volume 9, pages 520–523, September-October 1952.

Drug and Cosmetic Industry, volume 40, No. 2, page 237. February 1952.

JULIAN S. LEVITT, Primary Examiner.
V. C. CLARKE, Assistant Examiner.